(12) United States Patent
Ramsey et al.

(10) Patent No.: US 7,933,914 B2
(45) Date of Patent: Apr. 26, 2011

(54) AUTOMATIC TASK CREATION AND EXECUTION USING BROWSER HELPER OBJECTS

(75) Inventors: William D. Ramsey, Redmond, WA (US); Qi Steven Yao, Sammamish, WA (US); Sanjeev Katariya, Bellevue, WA (US); Zhanliang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 11/294,581

(22) Filed: Dec. 5, 2005

(65) Prior Publication Data

US 2007/0130186 A1    Jun. 7, 2007

(51) Int. Cl.
*G06F 17/30* (2006.01)
*G06F 15/16* (2006.01)

(52) U.S. Cl. ......... 707/760; 715/224; 707/755; 707/771

(58) Field of Classification Search ............... 707/104.1, 707/601, 751, 755, 760, 771; 715/500, 700, 715/224

See application file for complete search history.

(56) References Cited

U.S. PATENT DOCUMENTS

| | | | |
|---|---|---|---|
| 4,736,296 A | 4/1988 | Katayama et al. |
| 4,965,763 A | 10/1990 | Zamora |
| 4,974,191 A | 11/1990 | Amirghodsi et al. |
| 5,208,816 A | 5/1993 | Seshardi et al. |
| 5,477,451 A | 12/1995 | Brown et al. |
| 5,577,241 A | 11/1996 | Spencer |
| 5,625,814 A | 4/1997 | Luciw |
| 5,636,036 A | 6/1997 | Ashbey |
| 5,696,962 A | 12/1997 | Kupiec |
| 5,748,974 A | 5/1998 | Johnson |
| 5,752,244 A | 5/1998 | Rose et al. |
| 5,754,173 A | 5/1998 | Hiura et al. |
| 5,754,174 A | 5/1998 | Carpenter et al. |
| 5,794,259 A | 8/1998 | Kikinis |
| 5,832,459 A | 11/1998 | Cameron et al. |
| 5,855,015 A | 12/1998 | Shoham |
| 5,892,900 A | 4/1999 | Ginter et al. |
| 5,999,948 A | 12/1999 | Nelson et al. |
| 6,055,528 A | 4/2000 | Evans |

(Continued)

FOREIGN PATENT DOCUMENTS

EP    1 571 578 A1    9/2005

(Continued)

OTHER PUBLICATIONS

Elinor Mills; "Google Flight search teakes off", http://www.news.com/Google-flight-search-takes-off/2100-1038_3-5917821.html; Oct. 28, 2005.*

(Continued)

*Primary Examiner* — Tony Mahmoudi
*Assistant Examiner* — Dennis Truong
(74) *Attorney, Agent, or Firm* — Merchant & Gould P.C.

(57) ABSTRACT

A task system and method are provided. The system provides an automated approach for task creation, maintenance and/or execution. The system includes a browser that receives search results and at least one task associated with a query from a search engine. The system further includes a browser helper object that binds to the browser at runtime. The browser helper object provides information associated with a user's action with respect to the search results and/or at least one task. The information can be employed as feedback to update model(s) (e.g., query classification model(s) and/or slot-filling model(s)) of a semantic reasoning component that retrieves task based, at least in part, upon user query(ies).

17 Claims, 14 Drawing Sheets

U.S. PATENT DOCUMENTS

| | | | |
|---|---|---|---|
| 6,078,914 A | 6/2000 | Redfern | |
| 6,088,700 A | 7/2000 | Larsen et al. | |
| 6,118,939 A | 9/2000 | Nack et al. | |
| 6,212,494 B1 | 4/2001 | Boguraev | |
| 6,278,996 B1 | 8/2001 | Richardson et al. | |
| 6,314,398 B1 | 11/2001 | Junqua et al. | |
| 6,513,006 B2 | 1/2003 | Howard et al. | |
| 6,643,620 B1 | 11/2003 | Contolini et al. | |
| 6,675,159 B1 | 1/2004 | Lin et al. | |
| 6,678,677 B2 | 1/2004 | Roux et al. | |
| 6,678,694 B1 | 1/2004 | Zimmerman et al. | |
| 6,690,390 B1 | 2/2004 | Walters et al. | |
| 6,724,403 B1 | 4/2004 | Santoro et al. | |
| 6,751,606 B1 | 6/2004 | Fries et al. | |
| 6,816,857 B1 | 11/2004 | Weissman et al. | |
| 6,850,252 B1 | 2/2005 | Hoffberg | |
| 6,901,399 B1 | 5/2005 | Corston et al. | |
| 6,904,402 B1 | 6/2005 | Wang et al. | |
| 6,910,003 B1* | 6/2005 | Arnold et al. | 704/4 |
| 6,947,923 B2 | 9/2005 | Cha et al. | |
| 7,020,607 B2 | 3/2006 | Adachi | |
| 7,020,658 B1 | 3/2006 | Hill | |
| 7,328,199 B2 | 2/2008 | Ramsey et al. | |
| 7,523,099 B1* | 4/2009 | Egnor et al. | 707/3 |
| 2002/0032680 A1 | 3/2002 | Garber | |
| 2002/0042793 A1 | 4/2002 | Choi | |
| 2002/0045463 A1 | 4/2002 | Chen et al. | |
| 2002/0049750 A1 | 4/2002 | Venkatram | |
| 2002/0059132 A1 | 5/2002 | Quay | |
| 2002/0065959 A1 | 5/2002 | Kim et al. | |
| 2002/0101448 A1 | 8/2002 | Sanderson | |
| 2002/0124115 A1 | 9/2002 | McLean et al. | |
| 2002/0143949 A1 | 10/2002 | Rajarajan et al. | |
| 2002/0152190 A1 | 10/2002 | Biebesheimer et al. | |
| 2003/0023598 A1 | 1/2003 | Janakiraman et al. | |
| 2003/0078766 A1 | 4/2003 | Appelt | |
| 2003/0084035 A1 | 5/2003 | Emerick | |
| 2003/0120700 A1 | 6/2003 | Boudnik et al. | |
| 2003/0135584 A1 | 7/2003 | Roberts et al. | |
| 2003/0222912 A1 | 12/2003 | Fairweather | |
| 2004/0030556 A1* | 2/2004 | Bennett | 704/270 |
| 2004/0030697 A1 | 2/2004 | Cochran et al. | |
| 2004/0030710 A1 | 2/2004 | Shadle | |
| 2004/0034652 A1 | 2/2004 | Hofmann et al. | |
| 2004/0111419 A1 | 6/2004 | Cook et al. | |
| 2004/0117395 A1 | 6/2004 | Gong et al. | |
| 2004/0122674 A1 | 6/2004 | Bangalore et al. | |
| 2004/0130572 A1 | 7/2004 | Bala | |
| 2004/0148154 A1 | 7/2004 | Acero et al. | |
| 2004/0181749 A1* | 9/2004 | Chellapilla et al. | 715/505 |
| 2004/0220893 A1 | 11/2004 | Spivack | |
| 2004/0236580 A1 | 11/2004 | Bennett | |
| 2004/0250255 A1 | 12/2004 | Kraiss et al. | |
| 2004/0260534 A1* | 12/2004 | Pak et al. | 704/7 |
| 2004/0260689 A1 | 12/2004 | Colace | |
| 2004/0267725 A1 | 12/2004 | Harik | |
| 2005/0027666 A1 | 2/2005 | Beck et al. | |
| 2005/0028133 A1 | 2/2005 | Ananth et al. | |
| 2005/0034098 A1 | 2/2005 | DeSchryver et al. | |
| 2005/0044058 A1 | 2/2005 | Matthews et al. | |
| 2005/0049852 A1 | 3/2005 | Chao | |
| 2005/0049874 A1 | 3/2005 | Coffman et al. | |
| 2005/0065995 A1 | 3/2005 | Milstein et al. | |
| 2005/0075859 A1 | 4/2005 | Ramsey | |
| 2005/0075878 A1 | 4/2005 | Balchandran et al. | |
| 2005/0078805 A1 | 4/2005 | Mills et al. | |
| 2005/0080625 A1 | 4/2005 | Bennett et al. | |
| 2005/0080782 A1 | 4/2005 | Ratnaparkhi et al. | |
| 2005/0086059 A1 | 4/2005 | Bennett | |
| 2005/0114854 A1 | 5/2005 | Padisetty et al. | |
| 2005/0131672 A1 | 6/2005 | Dalal et al. | |
| 2005/0132380 A1 | 6/2005 | Chow | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0187818 A1 | 8/2005 | Zito et al. | |
| 2005/0192992 A1 | 9/2005 | Reed | |
| 2005/0193055 A1* | 9/2005 | Angel et al. | 709/202 |
| 2005/0216356 A1 | 9/2005 | Pearce et al. | |
| 2005/0228744 A1 | 10/2005 | McHale | |
| 2005/0246726 A1 | 11/2005 | Labrou | |
| 2005/0257148 A1 | 11/2005 | Goodman et al. | |
| 2005/0283473 A1 | 12/2005 | Rousso et al. | |
| 2006/0005114 A1 | 1/2006 | Louch et al. | |
| 2006/0005207 A1 | 1/2006 | Louch et al. | |
| 2006/0059434 A1* | 3/2006 | Boss et al. | 715/780 |
| 2006/0064302 A1 | 3/2006 | Ativanichayaphong et al. | |
| 2006/0064411 A1* | 3/2006 | Gross et al. | 707/3 |
| 2006/0107219 A1 | 5/2006 | Ahya et al. | |
| 2006/0129463 A1* | 6/2006 | Zicherman | 705/26 |
| 2006/0156248 A1 | 7/2006 | Chaudhri et al. | |
| 2006/0179404 A1* | 8/2006 | Yolleck et al. | 715/507 |
| 2006/0206835 A1 | 9/2006 | Chaudhri et al. | |
| 2007/0027850 A1 | 2/2007 | Chan et al. | |
| 2007/0038614 A1 | 2/2007 | Guha | |
| 2007/0038934 A1 | 2/2007 | Fellman | |
| 2007/0067217 A1 | 3/2007 | Schachter et al. | |
| 2007/0100688 A1 | 5/2007 | Book | |
| 2007/0101279 A1 | 5/2007 | Chaudhri et al. | |
| 2007/0101297 A1 | 5/2007 | Forstall et al. | |
| 2007/0106495 A1 | 5/2007 | Ramsey et al. | |
| 2007/0106496 A1 | 5/2007 | Ramsey et al. | |
| 2007/0124263 A1 | 5/2007 | Katariya et al. | |
| 2007/0130124 A1 | 6/2007 | Ramsey et al. | |
| 2007/0130134 A1 | 6/2007 | Ramsey et al. | |
| 2007/0192179 A1 | 8/2007 | Van Luchene | |
| 2007/0209013 A1 | 9/2007 | Ramsey et al. | |

FOREIGN PATENT DOCUMENTS

| | | |
|---|---|---|
| EP | 1 580 666 A2 | 9/2005 |
| WO | 0129823 A1 | 4/2001 |
| WO | 03001413 A1 | 1/2003 |
| WO | WO 2004/017230 A1 | 2/2004 |
| WO | WO 2005/036365 A2 | 4/2005 |

OTHER PUBLICATIONS

Google Toolbar; "Revision History"; http://www.google.com/support/toolbar/bin/static.py?page=version_info.html; Dec. 11, 2000.*

Elinor Mills; "Google Flight search teakes off", http:llwww.news.comIGoogle-flight-search-takes-off12100-1038_3-5917821_.html; Oct. 28, 2005.*

U.S. Appl. No. 11/290,076, filed Nov. 30, 2005, Ramsey, et al.

U.S. Appl. No. 11/246,847, filed Oct. 7, 2005, Ramsey, et al.

U.S. Appl. No. 11/270,407, filed Nov. 9, 2005, Ramsey, et al.

U.S. Appl. No. 11/294,265, filed Dec. 5, 2005, Ramsey, et al.

U.S. Appl. No. 11/294,262, filed Dec. 5, 2005, Ramsey, et al.

"DTS: Programming: Creating the Custom Task Framework", 1 page, accessible at: http://msdn.microsoft.com/library/default.asp?url=/library/en-us/dtsprog/dtspcusttskc_3hwr.asp, last accessed Jan. 5, 2006.

Ernst, et al., "A Task Framework for the Web Interface W2H", Bioinformatics, 2003, pp. 278-282, vol. 19, No. 2, Oxford University Press.

Multi-Agent Systems Lab, "TAEMS: A Framework for Task Analysis, Environment Modeling, and Simulation", 3 pages, acessible at: http://dis.cs.umass.edu/research/taems/, last accessed Jan. 5, 2006.

Hochberg, et al., "A Flexible Framework for Developing Mixed-Initiative Dialog Systems", Association for Computational Linguistics, Proceedings of the Third SIGdial Workshop on Discourse and Dialogue, Jul. 2002, pp. 60-63, Philadelphia.

AgileTek, "Componentized Architecture", 2 pges, accessible at: http://www.agiletek.com/agileplus#CompArchitecture, last accessed Jan. 5, 2006.

H. Lieberman, et al., "Instructible Agents: Software That Just Keeps Getting Better", IBM Systems Journal, 1996, pp. 539-556, vol. 35, Nos. 3 and 4.

"Technical Forum: Machine Intelligence and the Turing Test", IBM Systems Journal, 2002, pp. 524-539, vol. 41, No. 3.

O. Conlan, et al., "Appliying Adaptive Hypermedia Techniques to Semantic Web Service Composition", In Proceedings of AH 2003: Workshop on Adaptive Hypermedia and Adaptive Web-based Systems, 2003, pp. 53-62.

H. Liu, et al., "GOOSE: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.

Leon Peshkin, "Research Statement", 2 pages, accessible at: http://people.csail.mit.edu/pesha/my_res.pdf, last accessed Jan. 5, 2006.

Korns Associates "Our Intelligent Agents", 4 pages, accessible at: http://www.korns.com/technology.htm, last accessed Jan. 5, 2006.

V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.

Esposito, Dino. "Browser Helper Objects:The Browser the Way You Want It." Microsoft Corporation, Jan. 1999, 12 pages.

International Search Reprot dated Mar. 29, 2007, mailed Mar. 30, 2007, for International Application No. PCT/US2006/044418, 3 pages.

Mills, "Google Flight search takes off", http://www.news.com/Google-flight-search-takes-pff/2100-1038_3-5917821.html; Oct. 28, 2005.

Google Toolbar; "Revision History"; http:www.google.com/support/toolbar/bin/static.py?page=version$_{13}$ info.html; Dec. 11, 2000.

Clarifying Search : A User-Interface Framework for Text Searches. Http://www.dlib.org/dlib/january97/retrieval/01shneiderman.html.

Free Microsoft Office Information Bridge Framework. Http://www.microsoft.com/industry/government/InformationBridge.mspx.

Usability for component Based Portals. http://www.128.ibm.com/developerworks/web/library/us-portal.

OA Dated Jun. 30, 2008 for U.S. Appl. No. 11/270,407, 33 pages.
OA Dated Jun. 26, 2008 for U.S. Appl. No. 11/367,292, 35 pages.
OA Dated Jun. 16, 2008 for U.S. Appl. No. 11/270,393, 21 pages.
OA Dated May 13, 2008 for U.S. Appl. No. 11/294,265, 27 pages.
AdWords Reference Guide, *Google*, 114 pages (Nov. 30, 2004).
U.S. Non-Final Office Action cited in U.S. Appl. No. 11/246,847 mailed Oct. 18, 2006.
U.S. Final Office Action cited in U.S. Appl. No. 11/246,847 mailed Apr. 11, 2007.
U.S. Non-Final Office Action cited in U.S. Appl. No. 11/270,393 mailed Dec. 19, 2006.
U.S. Final Office Action cited in U.S. Appl. No. 11/270,393 mailed Jun. 4, 2007.
U.S. Non-Final Office Action cited in U.S. Appl. No. 11/270,393 mailed Nov. 20, 2007.
U.S. Non-Final Office Action cited in U.S. Appl. No. 11/270,393 mailed Mar. 2, 2009.
U.S. Final Office Action cited in U.S. Appl. No. 11/270,407 mailed Jan. 2, 2009.
U.S. Non-Final Office Action cited in U.S. Appl. No. 11/290,076 mailed Feb. 14, 2008.
U.S. Final Office Action cited in U.S. Appl. No. 11/290,076 mailed Sep. 19, 2008.
U.S. Non-Final Office Action cited in U.S. Appl. No. 11/290,076 mailed Jun. 9, 2009.
U.S. Non-Final Office Action cited in U.S. Appl. No. 11/294,262 mailed Nov. 28, 2007.
U.S. Final Office Action cited in U.S. Appl. No. 11/294,262 mailed May 13, 2008.
U.S. Non-Final Office Action cited in U.S. Appl. No. 11/294,262 mailed Sep. 22, 2008.
U.S. Final Office Action cited in U.S. Appl. No. 11/294,262 mailed Mar. 12, 2009.
U.S. Non-Final Office Action cited in U.S. Appl. No. 11/294,262 mailed Aug. 21, 2009.
U.S. Non-Final Office Action cited in U.S. Appl. No. 11/294,265 mailed Nov. 28, 2007.
U.S. Non-Final Office Action cited in U.S. Appl. No. 11/294,265 mailed Nov. 26, 2008.
U.S. Non-Final Office Action cited in U.S. Appl. No. 11/294,265 mailed Jun. 12, 2009.
U.S. Non-Final-Office-Action cited in U.S. Appl. No. 11/367,292 mailed Dec. 10, 2008.
U.S. Final Office Action cited in U.S. Appl. No. 11/367,292 mailed Jun. 12, 2009.
U.S. Final Office Action cited in U.S. Appl. No. 11/294,265 on Dec. 16, 2009.
U.S. Non-Final Office Action cited in U.S. Appl. No. 11/294,265 mailed Feb. 23, 2010.
U.S. Non-Final Office Action cited in U.S. Appl. No. 11/367,292 mailed Feb. 23, 2010.
International Search Report mailed Apr. 11, 2007 in Application No. PCT/US2006/043663.
U.S. Final Office Action cited in U.S. Appl. No. 11/294,262 mailed Apr. 1, 2010.
U.S. Non-Final-Office-Action cited in U.S. Appl. No. 11/294,262 mailed Jul. 19, 2010.
Final Office Action from U.S. Appl. No. 11/367,292 mailed Oct. 13, 2010.
U.S. Final Office Action cited in U.S. Appl. No. 11/294,262 mailed Dec. 30, 2010, 20 pages.

* cited by examiner

AUTOMATIC TASK CREATION AND EXECUTION USING BROWSER HELPER OBJECTS

CROSS REFERENCE TO RELATED APPLICATION(S)

This application is related to co-pending U.S. patent application Ser. No. 11/270,407, filed Nov. 9, 2005, and entitled, "ADAPTIVE TASK FRAMEWORK", co-pending U.S. patent application Ser. No. 11/270,393, filed Nov. 9, 2005, and entitled, "ADAPTIVE TASK FRAMEWORK", and, co-pending U.S. patent application Ser. No. 11/290,076, filed Nov. 30, 2005, and entitled, "ADAPTIVE SEMANTIC REASONING ENGINE". The entirety of the aforementioned applications is hereby incorporated by reference.

BACKGROUND

Human languages are rich and complicated, including huge vocabularies with complex grammar and contextual meaning. Machine interpretation of human language, even in a very limited way, is an extremely complex task and continues to be the subject of extensive research. Providing users with the ability to communicate their desires to an automated system without requiring users to learn a machine specific language or grammar would decrease learning costs and greatly improve system usability. However, users become quickly frustrated when automated systems and machines are unable to interpret user input correctly, resulting in unexpected results.

Natural language input can be useful for a wide variety of applications, including virtually every software application with which humans are intended to interact. Typically, during natural language processing the natural language input is separated into tokens and mapped to one or more actions provided by the software application. Each application can have a unique set of actions. Consequently, it can be both time-consuming and repetitive for software developers to draft code to interpret natural language input and map the input to the appropriate action for each application.

The Internet in particular has provided users with a mechanism for obtaining information regarding any suitable subject matter. For example, various websites are dedicated to posting text, images, and video relating to world, national, and/or local news. A user with knowledge of a Uniform Resource Locator (URL) associated with one of such websites can simply enter the URL into a web browser to be provided with the website and access content thereon. Another conventional manner of locating desired information from the Internet is through utilization of a search engine. For instance, a user can enter a word or series of words into a search field and thereafter initiate the search engine (e.g., through depression of a button, one or more keystrokes, voice commands, . . . ). The search engine then utilizes search algorithms to locate websites related to the word or series of words entered by the user into the search field, and the user can then select one of the websites returned by the search engine to review content therein.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A task system and method are provided. Task(s) are useful in modeling actions user(s) perform, for example, on the web. Examples of tasks include buying plane tickets, purchasing books, reserving cars, buying stocks, checking accounts, or checking the weather in a particular city. Task(s) can be executed on a variety of websites and individual user(s) can have individual preferences as to which site best matches their needs.

The system provides an automated approach for task creation, maintenance and/or execution. Furthermore, by distributing the processes of task creation, maintenance and/or execution to end-user(s), the entire task system can improve without the guidance of a central authority.

The system includes a browser that receives search results and task(s) associated with a query from a search engine. The system further includes a browser helper object that binds to the browser at runtime. The browser helper object provides information (e.g., to the search engine) associated with a user's action with respect to the search results and/or at least one task.

The system automatically generates and/or executes task(s) using Browser Helper Object(s) (BHOs). BHOs are objects that bind to the browser at runtime and behave as if they were part of the browser. The web browser is an application program that is capable of displaying a web page (e.g., Internet Explorer).

Thus, the BHO is a piece of code that effectively becomes part of the browser through the extensibility of the browser. BHOs are capable of accessing an object model corresponding to a schema of the source code (e.g., HTML) that is created when a web page is loaded. Additionally, BHOs can insert value(s) into form(s) (e.g., HTML form(s)). BHOs are further capable of communicating with other component(s).

In one example, the browser and the browser helper object(s) communicate directly with a semantic reasoning component. In another example, the browser and/or browser helper object(s) communicate with a search engine that in turn communicates with the semantic reasoning component. In a client-server environment, the semantic reasoning component can be a component of a task server. In a distributed processing environment, at least a portion of the semantic reasoning component can be resident on a user's computer system.

When a website is loaded, the BHO can walk an object model representation of the source code (e.g., HTML) and determine, for example, that there are INPUT box(es), for item(s) such as "Going to:" and "Leaving from:" fields and/or that there are SELECT box(e)s for the time of day containing elements such as "Morning", "Noon", "Evening" and "Anytime". The BHO can insert a value into one or more of the input/selection box(es).

The BHO can communicate with the search engine to facilitate various function(s). For example, based on information received from the BHO, the search engine can log an original query entered to the browser. The search engine can further log website(s) within a time window that the user has visited and entered information contained in the original query.

The BHO can receive a uniform resource locator (URL) containing semantic information and fill-in value(s) on a form associated with the URL. For example, the query "flight from Boston to Seattle" can return a link to a website with some parameters such as tcy="Boston" and fcy="Seattle. The BHO can interpret this information and fill in information value(s) based, at least in part, upon the original query. The BHO can further store a query entered into a search page so that it can be used for logging purposes. Finally, the BHO can further appropriately display results received from the search engine.

The BHO can provide information regarding a URL selected by a user. This information can be employed by the semantic reasoning component to update information retrieval and/or query classification model(s). The BHO can provide information regarding a website manually navigated to be a user. This information can be employed by the semantic reasoning engine to create new task(s). Finally, if information from the query is included in a form filled in by a user, the BHO can provide information regarding a form filled by the user. Slot filling model(s) of the semantic reasoning component can be updated based on this information.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
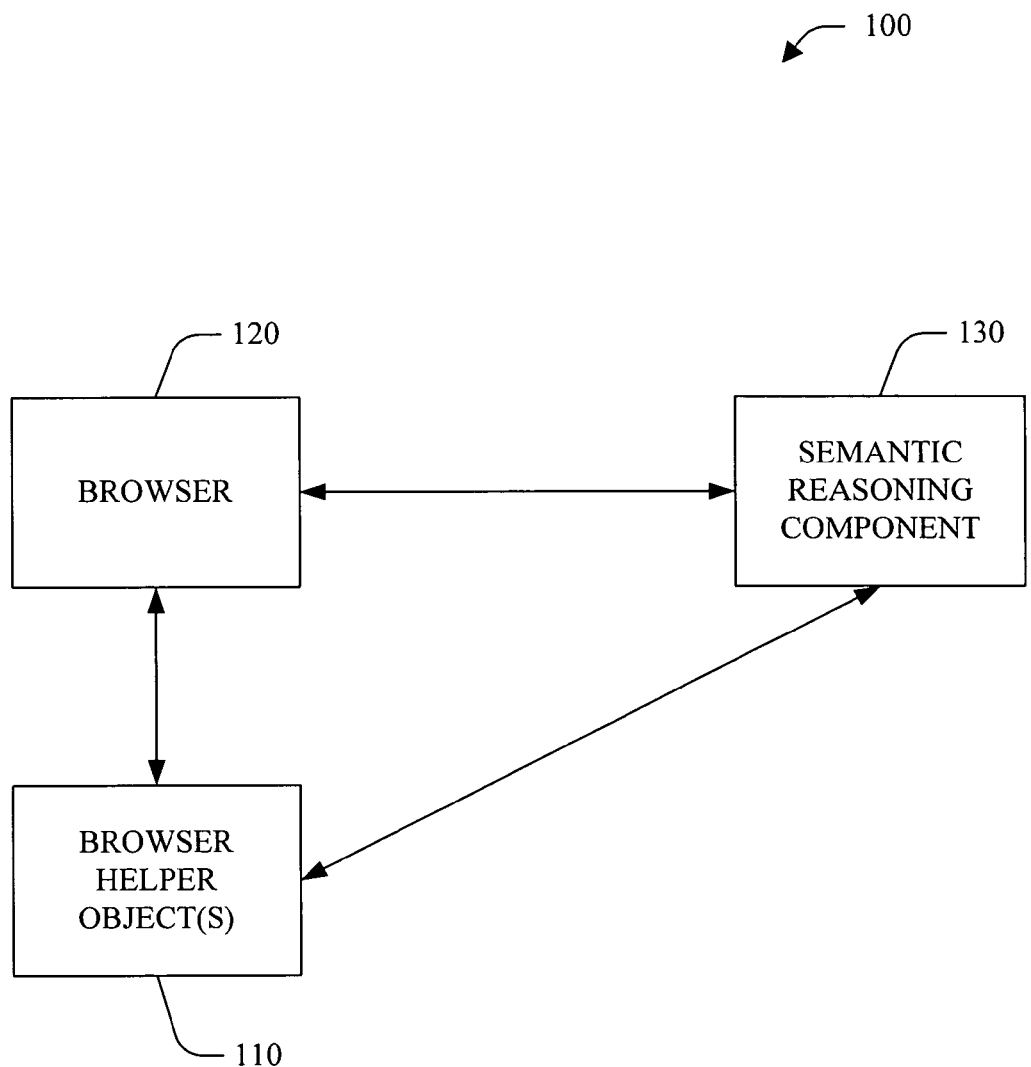
FIG. 1 is a block diagram of a task system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Referring to FIG. 1, a task system 100 is illustrated. As noted previously, task(s) are useful in modeling actions user (s) perform, for example, on the web. Examples of tasks include buying plane tickets, purchasing books, reserving cars, buying stocks, checking accounts, or checking the weather in a particular city. Task(s) can be executed on a variety of websites and individual user(s) can have individual preferences as to which site best matches their needs.

The process of creating a comprehensive task list can be daunting. The sheer number of sites that exist covering a wide range of services can be prohibitive to employ a manual method for creating tasks and maintaining them. The system 100 provides an automated approach for task creation, maintenance and/or execution. Furthermore, by distributing the processes of task creation, maintenance and/or execution to end user(s), the entire task system can improve without the guidance of a central authority.

The system 100 automatically generates task(s) and/or executes them using Browser Helper Object(s) (BHOs) 110. BHOs 110 are objects that bind to a browser 120 at runtime and behave as if they were part of the browser 120. The BHO 110 provides information associated with a user's action with respect to search results and/or task(s), as discussed below. The web browser 120 is an application program that is capable of displaying a web page (e.g., Internet Explorer).

The BHO 110 is a piece of code that effectively becomes part of the browser 120 through the extensibility of the browser 120. BHOs 110 are capable of accessing an object model corresponding to a schema of the source code (e.g., HTML) that is created when a web page is loaded. Additionally, BHOs 110 can insert value(s) into form(s) (e.g., HTML form(s)). BHOs 110 are further capable of communicating with other component(s, as discussed below.

Figure 2:
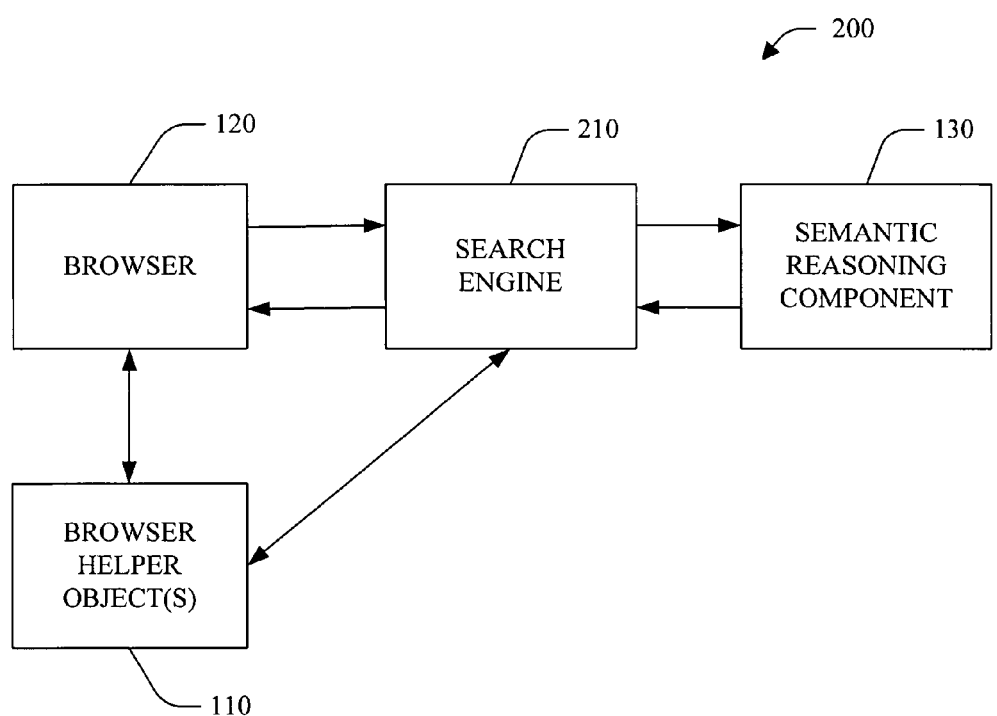
FIG. 2 is a block diagram of a task system.

In one example, the browser 110 and the browser helper object(s) 120 communicate directly with a semantic reasoning component 130. In another example, as illustrated in FIG. 2, the browser 110 and/or browser helper object(s) 120 communicate with a search engine 210 that in turn communicates with the semantic reasoning component 130.

In a client-server environment, the semantic reasoning component 130 can be a component of a task server (not shown). In a distributed processing environment, at least a portion of the semantic reasoning component 130 can be resident on a user's computer system (not shown).

When a website is loaded, the BHO 110 can walk an object model representation of the source code (e.g., HTML) and determine, for example, that there are INPUT box(es), for item(s) such as "Going to:" and "Leaving from:" fields and/or that there are SELECT box(e)s for the time of day containing elements such as "Morning", "Noon", "Evening" and "Anytime". The BHO 110 can insert a value into one or more of the input/selection box(es). For example, the BHO 110 can insert a value of "Boston" into an INPUT box named "tcy", if the BHO 110 is notified that Value(tcy)="Boston".

The BHO 110 can communicate with the search engine 210 to facilitate various function(s). For example, based on information received from the BHO 110, the search engine can log an original query entered to the browser 110 (e.g., "flight to Boston from Seattle"). The search engine 210 can further log website(s) within a time window that the user has visited and entered "Boston" or "Seattle" as values in the web form (e.g., Site=Expedia.com). Based upon information received from the BHO 110, the search engine 210 can also log value(s) on the form (e.g., tcy="Boston", fcy="Seattle"). In one example, the information provided to search engine 210 by the BHO 110 does not contain any information which is constituted as personally identifiable.

The BHO 110 can receive a uniform resource locator (URL) containing semantic information and fill-in value(s) on a form associated with the URL. For example, the query "flight from Boston to Seattle" can return a link to a website with some parameters such as tcy="Boston" and fcy="Seattle. The BHO 110 can interpret this information and fill in information value(s) based, at least in part, upon the original query. The BHO 110 can further store a query entered into a search page so that it can be used for logging purposes. Finally, the BHO 110 can further appropriately display results received from the search engine 210.

Semantic Reasoning Component 130

Providing Search Results for Query(ies)

The semantic reasoning component 130 is responsible for providing search results for queries. A first step returns a list of potential tasks using a combination of Information Retrieval (IR) and Query Classification (QC) applications. This step can return a list of likely tasks such as Expedia.com, Travelocity.com, Orbitz.com, etc. A second step takes the query and potential task (Expedia.com) and attempts to fill in parameter value(s) in the task such as determining that the variable "tcy" should have the value "Boston".

Logging of User Data

The semantic reasoning component 130 can further log data returned from BHOs 110. For example, the semantic reasoning component 130 can log the task selected by the user for a model employed by the QC application (QC model). Additionally, the semantic reasoning component 130 can log site(s) the user goes to and enters information contained in the original query. The semantic reasoning component 130 can log value(s) entered on the web page (e.g., according to privacy laws and policy).

Creating New Task(s)

Additionally, the semantic reasoning component 130 can create new task(s) based, at least in part, upon information provided by the BHOs 110. For example, when a user manually visits a new site after entering a search query the data can be provided by the BHO 110 to the semantic reasoning component 130 (e.g., via the search engine 210) that logs the data. If the site has not been seen before, a new task can be created.

Updating the Reasoning and/or Scoring Models

The semantic reasoning component 130 can include a QC model employed for task retrieval and/or a slot-filling model (as discussed below). One or both of these models can be updated periodically to reflect user feedback.

Overview of the Semantic Reasoning Component 130

The semantic reasoning component 130 provides the search engine 210 with a standardized method for interpreting natural language input. Additionally, the semantic reasoning component 130 can provide application developer(s) with a standard manner of defining the tasks the search engine 210 is capable of performing. A task, as used herein, describes and defines a fundamental unit of action relevant to user. The semantic reasoning component 130 enables the search engine 210 to define and manage tasks. Task(s) may be defined using extended markup language (XML), databases, text files or in any other suitable manner.

The search engine 210 can receive any manner of natural language input (e.g., handwritten text, tablet input, speech and typed text). The search engine 210 can process the natural language input to generate a query for processing by the semantic reasoning component 130 (e.g., a simple string of text characters). The semantic reasoning component 130 selects one or more tasks based, at least in part, upon the query. The semantic reasoning component 130 can provide the task along with associated metadata and slot information to describe an action to the search engine 210.

Figure 3:
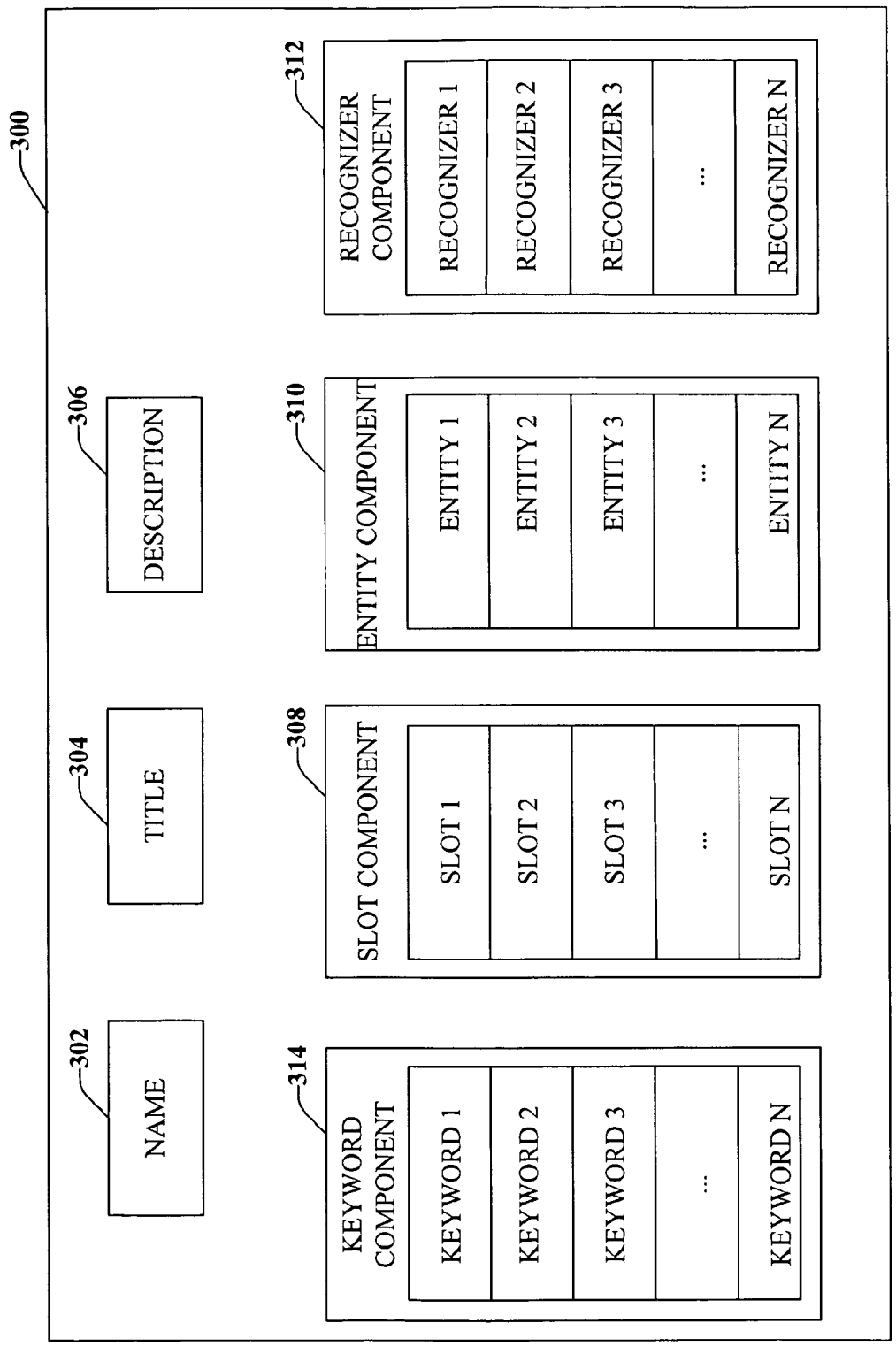
FIG. 3 is a diagram of an exemplary task.

Overall, the semantic reasoning component 130 is responsible for:

a. Receiving an input query;
b. Finding a set of likely tasks given the input query;
c. Filling out slot values given a task and the input query;
d. Retrieving the most likely tasks with the most like slot values; and,
e. (optionally) Receiving feedback data to learn from user feedback Referring to FIG. 3, an exemplary task 300 is illustrated. The task 300 can be generated by the semantic reasoning component 130 in response to a user's query. For example, the task 300 can include a name 302 that identifies the task 300 (e.g., a task for booking airline flights may be named "BookFlight"). The task 300 can also include a title 304, for example, that can be displayed to users. Additionally, the task 300 can include a description 306 that briefly describes the task 300. The description 306 can be displayed to users either to allow the users to select the appropriate task 300 or confirm that the appropriate task 300 has been selected. For example, the name, title and description can be implemented using alphanumeric text strings.

The task 300 can include an entity component 310. The entity component 310 can include one or more named entities. A named entity, as used herein, is a token that is known to have a specific meaning. The named entity can be task specific or can be utilized with multiple tasks. The task 300 can include a named entity (NE) recognizer component 312. The NE recognizer component 312 can include one or more recognizers capable of matching tokens or portions of the natural language input to the entities included in the entity component 310. The NE recognizers 312 are capable of recognizing tokens corresponding to the named entities contained within the entities component 310. These tokens have a specific task meaning. Recognizers may be general or may be specific to a certain category of tokens. For example, a city recognizer may include a list of names (e.g., Seattle, Boston). Similarly, a date recognizer may be capable of recognizing and interpreting dates, such as "Jun. 14, 2005." The software developer may define certain recognizers when specifying a task.

The task 300 can also include a keyword component 314. The keyword component 314 can include one or more keywords. Keywords can be used to select a task 300 from a set of tasks. For example, the "BookFlight" task keyword component 314 can include keywords such as "Book Flight," "airline" and the like. The keywords can be determine by the software developer or automatically generated by the semantic reasoning component 130. In addition, the semantic reasoning component 130 can add additional keywords to the keyword component 314 based upon natural language input, user actions and/or user feedback. Furthermore, the keywords may be weighted, such that the presence of certain keywords in the query is more likely to surface certain tasks. Such weight can also be used to rank or order a selected group of tasks.

The task 300 can also include a slot component 308 that specifies or defines slots for information required for the task. The slot component 308 can provide a mechanism for defining parameters used by the task. For example, a task that books airline flights may include slots for the arrival city, the departure city, the flight date and time. The slot component 308 can include any integer number of slots, from zero to N. Typically, information from the natural language input is used to fill the slots.

Figure 4:
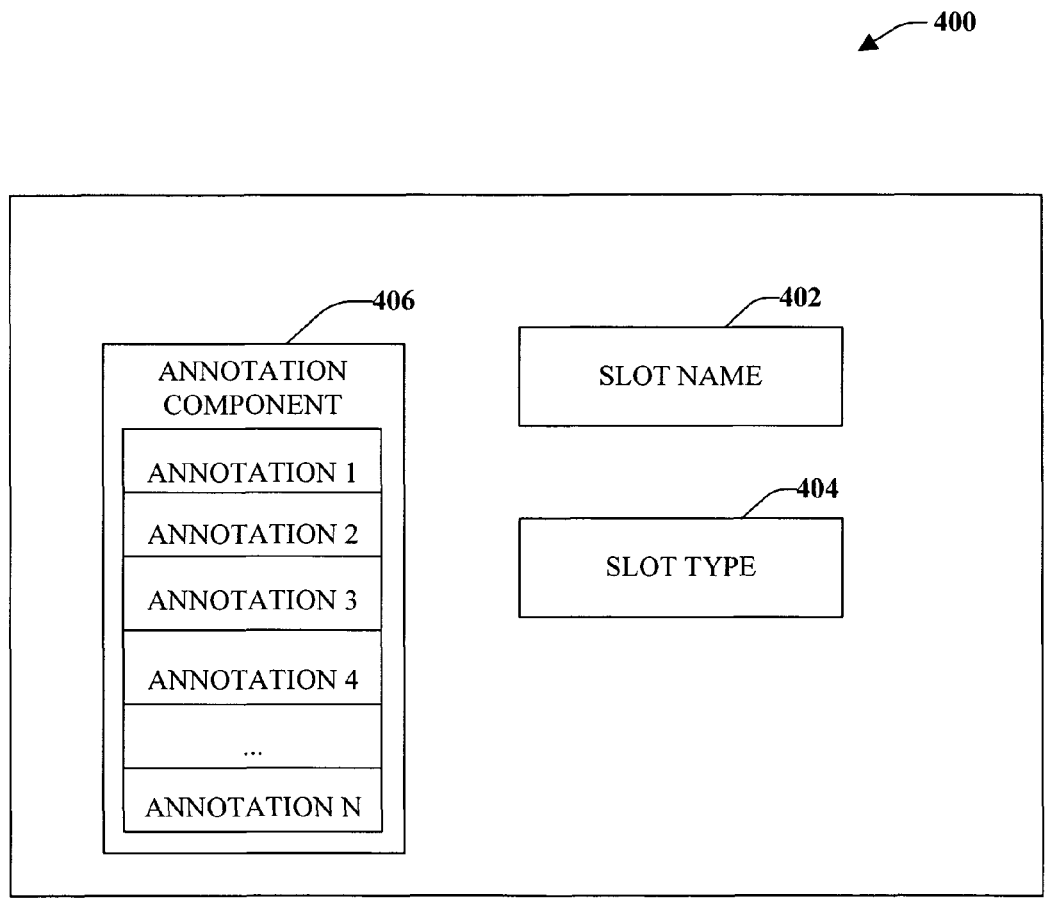
FIG. 4 is a diagram of an exemplary slot.

Turning next to FIG. 4, an exemplary slot 400 is illustrated. A slot 400 can include a slot name 402 that identifies the slot 400. For example, the BookFlight task discussed above can include slots named "DestinationCity," "ArrivalCity" and "Date." The slot 400 can also include a slot type 404. Slot type 404 indicates the type of the value of the slot data. Types can include integers, real numbers, textual strings and enumerated types (e.g., type "City" can include a list of city names).

The slot 400 can also include an annotation component 406. The annotation component 406 can include one or more annotations. Annotations are tokens that mark or indicate the significance of other tokens. The annotation component 406 identifies an annotation token and uses that information to interpret other tokens within the natural language input. For example, the token "from" when contained within a natural language input string that maps to a "BookFlight" task indicates that the token that follows is likely to contain the name of the departure city. Annotations may appear either before or after the relevant token. For example, the token "departure city" when contained within a natural language input string that maps to a "BookFlight" task indicates that the token that precedes it is likely to contain the name of the departure city. Consequently, the phrase "leaving from Boston" and "Boston departure city" can both be interpreted to fill the departure city slot with the value "Boston." Annotations which appear before the token are called pre-indicators, while annotations which follow the relevant token are called post-indicators. The annotation component 406 can recognize task system defined annotations as well as task specific annotations.

Figure 5:
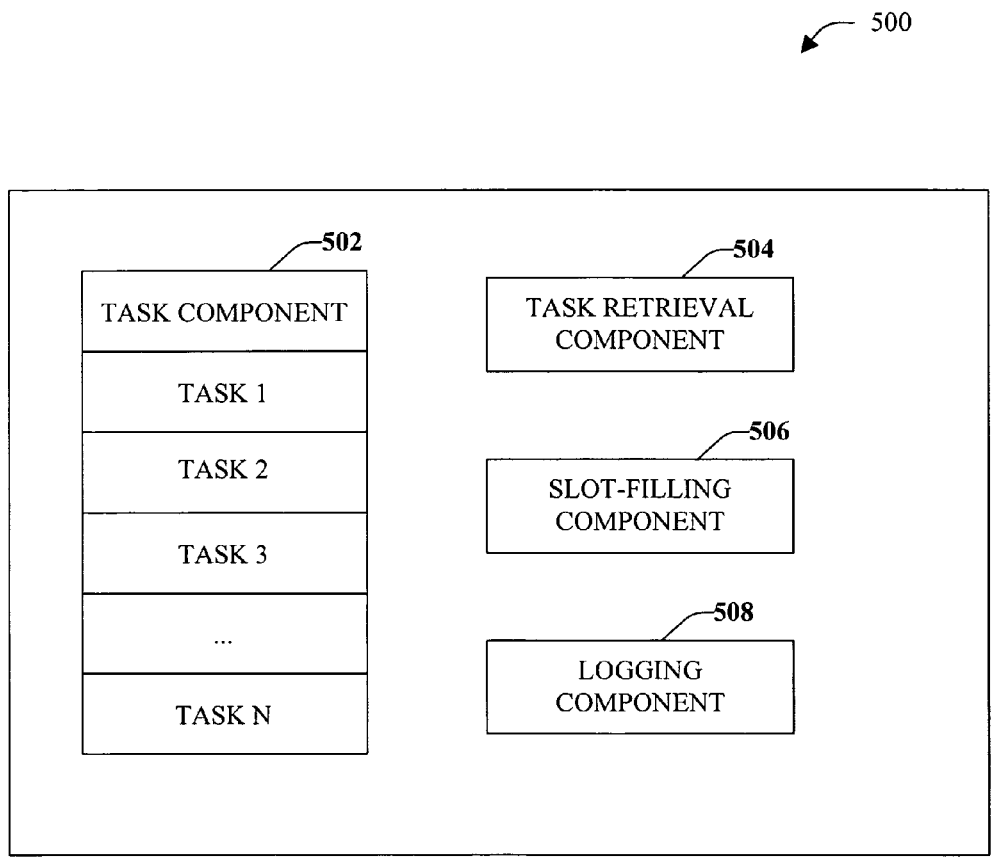
FIG. 5 is a block diagram of an exemplary task framework.

Next, referring to FIG. 5, an exemplary task framework 500 is illustrated. The framework 500 can include a task component 502 that includes one or more tasks, as described previously. The framework 500 can be a component of the semantic reasoning component 130.

Tasks can be generated by one or more applications or tasks can be generated automatically by the task framework 500. In addition, the task framework 500 may update or modify tasks generated by application(s). The task component 502 can be a flat file, a database or any other structure suitable for containing the data for one or more tasks.

The task framework 500 can include a task retrieval component 504. The task retrieval component 504 uses the query to select one or more tasks from the collection of tasks contained within the task component 502. The task retrieval component 504 may determine the appropriate task to be retrieved from the task component 502 based upon keywords in the query. The collection of tasks in the task component 502 can be indexed based upon the task keywords. The tokens contained within the query can be used to select an appropriate task or set of tasks. The application can also include additional information with the query. For example, the application could pass user context information to the framework to be used in the selection of the appropriate task. The task retrieval component 504 can use a variety of methodologies to select appropriate tasks. The task retrieval component 504 can be trained to improve performance based upon user actions and responses to the selected tasks.

In addition, the task framework 500 can include a slot-filling component 506. The slot-filling component 506 can be responsible for providing the best matching of the list of tokens from the natural language input or query with the task parameters. Typically, a slot-filling component 506 can receive a list of tokens and one or more tasks. The slot-filling component 506 can generate one or more possible mappings of the tokens to the slots of the task. The slot-filling component 506 can generate a score or rank for each of the possible mappings of tokens to task slots. The slot-filling component 506 can use a mathematical model, algorithm or function to calculate a score or rank for mappings. The slot-filling component 506 can utilize a heuristic function, a hidden Markov model, a Naïve Bayes based model, Maximum Entropy/Minimum Divergence Models (MEMD), blending strategies, linear discriminative models or any combination thereof to calculate a score for a mapping of tokens to a task.

The slot-filling component 506 can include a method responsible for taking the natural language input, culture information, a list of tokens, a list of named entities, a task and a predetermined maximum number of desired solutions. Culture information can include information such as the writing system and formatting utilized by the relevant culture. Named entities identify tokens with a specific meaning to the slot-filling system (e.g., Boston). The slot-filling component 506 can produce a list of up to the maximum number of requested semantic solutions with a semantic solution representing a mapping of tokens to slots that can be used by the search engine 210.

Optionally, the task framework 500 can also include a logging component 508. Tasks can pass information or feedback to the task framework 500 after completion of the task or during task processing. The logging component 508 stores the feedback information. This information can be used to train the task framework 500 and improve system performance. The feedback from tasks can include user actions. The task framework 500 can include a defined intent interface to facilitate feedback.

In addition, the task framework 500 or the slot-filling component 506 can include one or more GlobalRecognizers that provide the ability to recognize tokens that have special meaning to the task system in general. For example, the token "Boston" has special meaning as the city of Boston, Mass. The GlobalRecognizers property provides a set of recognizer components that identify special tokens, making them available throughout the entire system and across multiple tasks. For example, there may be several tasks that utilize "city," "date" or "number" entities. Entities are a mechanism for providing type information. For example the "city" entity includes a set of annotations (e.g., "city," "place," and "town"). Occurrences of the annotations within the list of tokens indicate the likelihood of a "city" entity. GlobalRecognizers allows such entities or special tokens to be defined once rather than for each individual task.

In summary, keywords are terms that might be used to surface a task. Slots are parameter values that may or may not be filled by the user Query. Slots are uniquely specified by their Name and Type.

Additionally, preIndicators are words that might disambiguate slots by occurring before a value "to Boston" would prefer the "Arrival City" slot over the "Departure City" slot even though Boston maps to CITY and can be a value for either slot. PostIndicators are words that might disambiguate slots by occurring before a value "from Boston" would prefer the "Departure City" slot over the "Arrival City" slot even though Boston maps to CITY and can be a value for either slot. Consider the example of Table 1:

TABLE 1

```
<Task Name="ReserveFlight">
<Keywords>cheap;tickets;flights;flight;vacations</Keywords>
<Slots>
    <Slot name="Arrival City" type= "CITY">
    <PreIndicators>to, going into</PreIndicators>
    <PostIndicators>arrival city</PostIndicators>
    </Slot>
        <Slot name="Departure City" type= "CITY">
    <PreIndicators>from, originating in</PreIndicators>
    <PostIndicators>departure city</PostIndicators>
    </Slot>
        <Slot name="Arrival Time" type= "TIME">
    <PreIndicators>arriving at</PreIndicators>
    <PostIndicators>arrival time</PostIndicators>
        </Slot>
        <Slot name=" Departure Time" type= "TIME">
    <PreIndicators>leaving at</PreIndicators>
    <PostIndicators>departure time</PostIndicators>
        </Slot>
        <Slot name="Adults" type= "INTEGER">
    <PreIndicators> </PreIndicators>
    <PostIndicators> adult, adults</PostIndicators>
        </Slot>
        <Slot name="Seniors" type= "INTEGER">
    <PreIndicators> </PreIndicators>
    <PostIndicators>senior,seniors</PostIndicators>
        </Slot>
        <Slot name="Children" type= "INTEGER">
    <PreIndicators> </PreIndicators>
    <PostIndicators>children,child,kid,kids</PostIndicators>
        </Slot>
</Slots>
</Task>
```

Given the schema of Table 1, the following queries match the ReserveFlight Task:

"I want a flight from Boston with a 8:30 PM departure time with 2 adults and 1 child"

"buy a ticket from Seattle to New York leaving at 5:15 PM"

Additionally, as discussed previously, the semantic reasoning component 130 can employ user feedback to learn from user behavior such that if users start entering queries such as "departing Boston for Seattle" to mean "Departure City"="Boston" and "Arrival City"="Seattle". The semantic reasoning component 130 will automatically learn the pattern "departing <Departure City> for <Arrival City>" without needing to explicitly add new Pre or Post indicators to the task definition.

User Perspective

Figure 6:
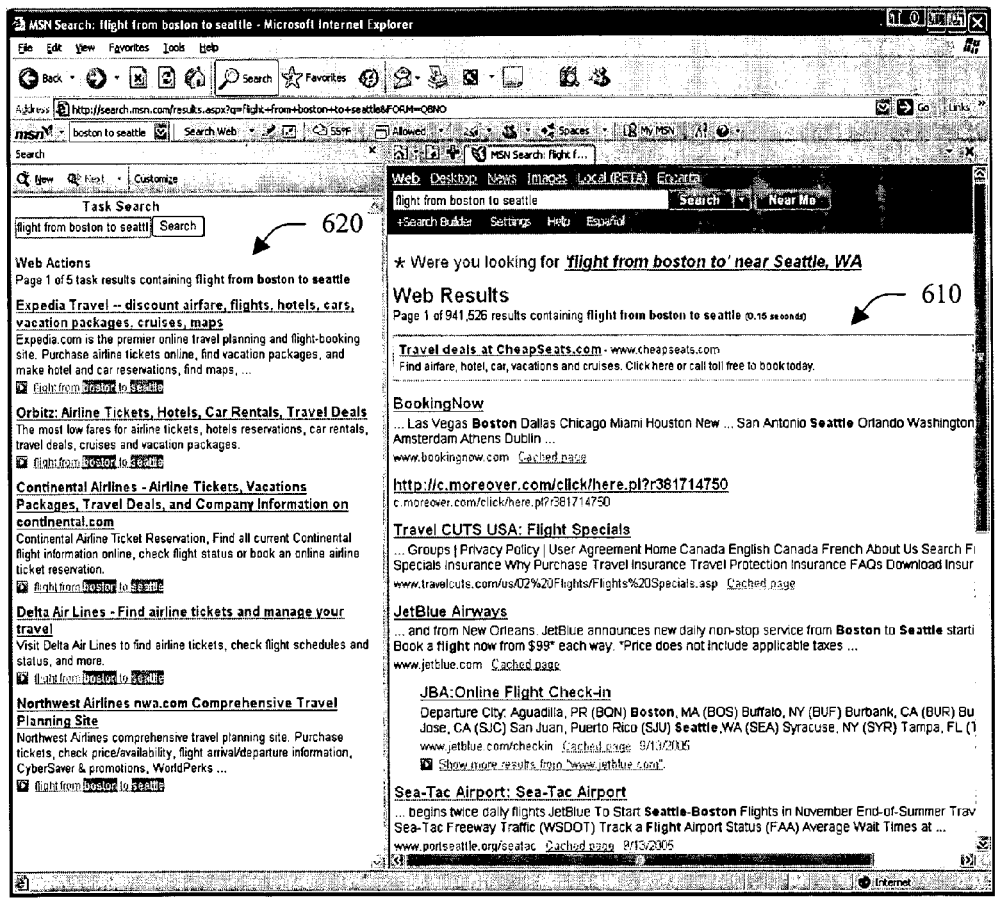
FIG. 6 is a screen shot of an exemplary user interface.

Returning to FIG. 2, from a user's perspective, using the browser 110, the user visits a search site associated with the search engine 210 and enters a query ("flights from Boston to Seattle"). A set of search results and a set of task results are returned from the search engine 210. Referring briefly to FIG. 6, an exemplary user interface 600 is illustrated. The user interface 600 includes a search results area 610 and a task results area 620.

Figure 7:
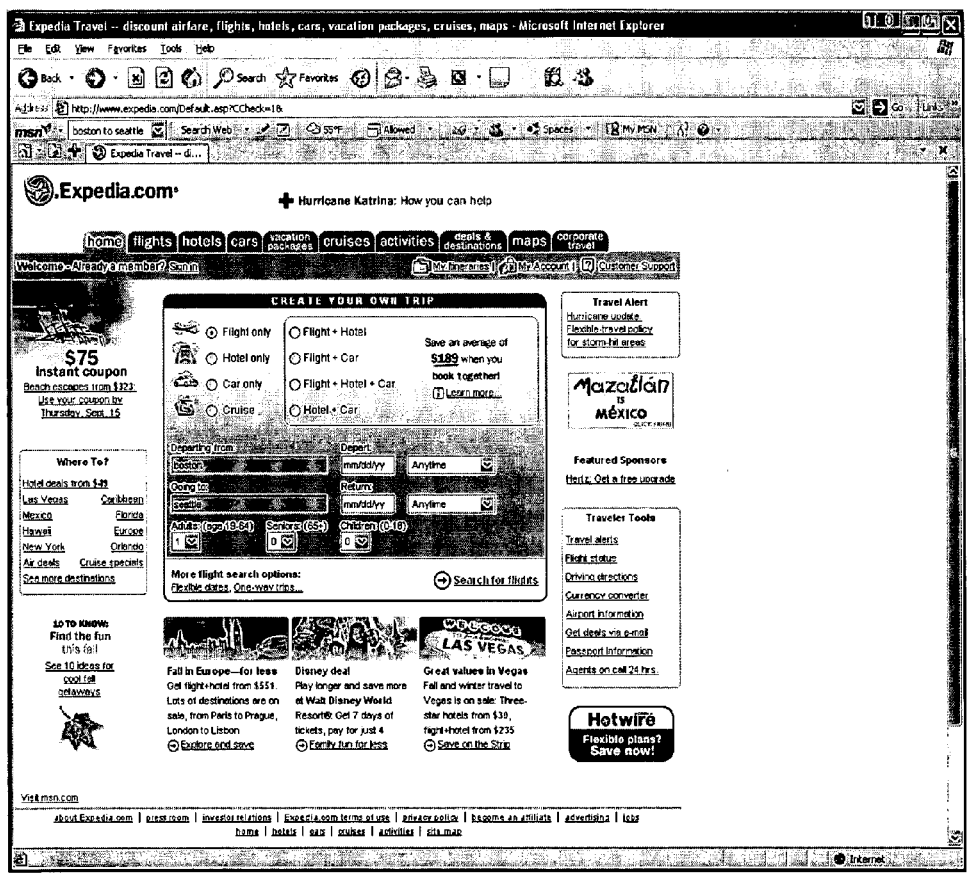
FIG. 7 is a screen shot of an exemplary user interface.

Referring back to FIG. 2, if the user sees the result the user desires, the user can click on the link and be brought to the site associated with the link. The BHO 110 and/or the search engine 210 can provide a notification of the click through to the semantic reasoning component 130, for example, to update the task retrieval query classifier model. If there are parameter value(s) recognized in the query, the parameter value(s) can be automatically be filled-in by the BHO 110 as illustrated in the exemplary user interface 700 of FIG. 7. In this example, the BHO 110 has filled-in the input box associated with "Departing from" with "boston" and the input box associated with "Going to" with "seattle" based on the original query input of "flight from boston to seattle".

Continuing with FIG. 2, if the user does not see a result the user likes, the user can manually navigate to a website. This may be a lengthy process such as navigating to a particular website and then to a particular page of the website (e.g., travel page). With respect to the travel example, once a user has arrived on a destination page, the user complete the form by entering values of "Boston" and "Seattle" into the appropriate elements on the form. The user then hits the "submit" button (e.g., "go", "search" and the like—causing a post event).

If there exists information entered into the form that was contained in the original query, the BHO 110 can send the information back to the semantic reasoning component 130 (e.g., in accordance with the privacy laws and policies). For example, if the user has typed "Boston" into a field named "originCity" then the query, URL of the website, the field name, and field value can be sent back to the semantic reasoning component 130.

If the URL is not contained in the database of tasks, the semantic reasoning component 130 can create a new task. The URL can be normalized to prevent millions of tasks from being created where the web pages are effectively the same but each individual URL may be unique due to cookies and/or other information supplied randomly. Thereafter, the object model (e.g., HTML object model) can be walked and a task created containing, for example:

The URL of the site (www.expedia.com);

Metadata contained on the site (keywords, text, etc.)

Parameter(s) (looking at Text Input Boxes, Drop-down Select Boxes, Radio Buttons, etc.)

Parameter Values (if parameters is a drop-down box, then load in the values contain in the drop-down list)

Additionally, the model(s) for slot filling can be updated accordingly. For example, a new parameter can be created, if it doesn't already exist. Further, the model(s) for slot filling can learn a pattern such as "from X" will put X in the "originCity" field.

Figure 8:
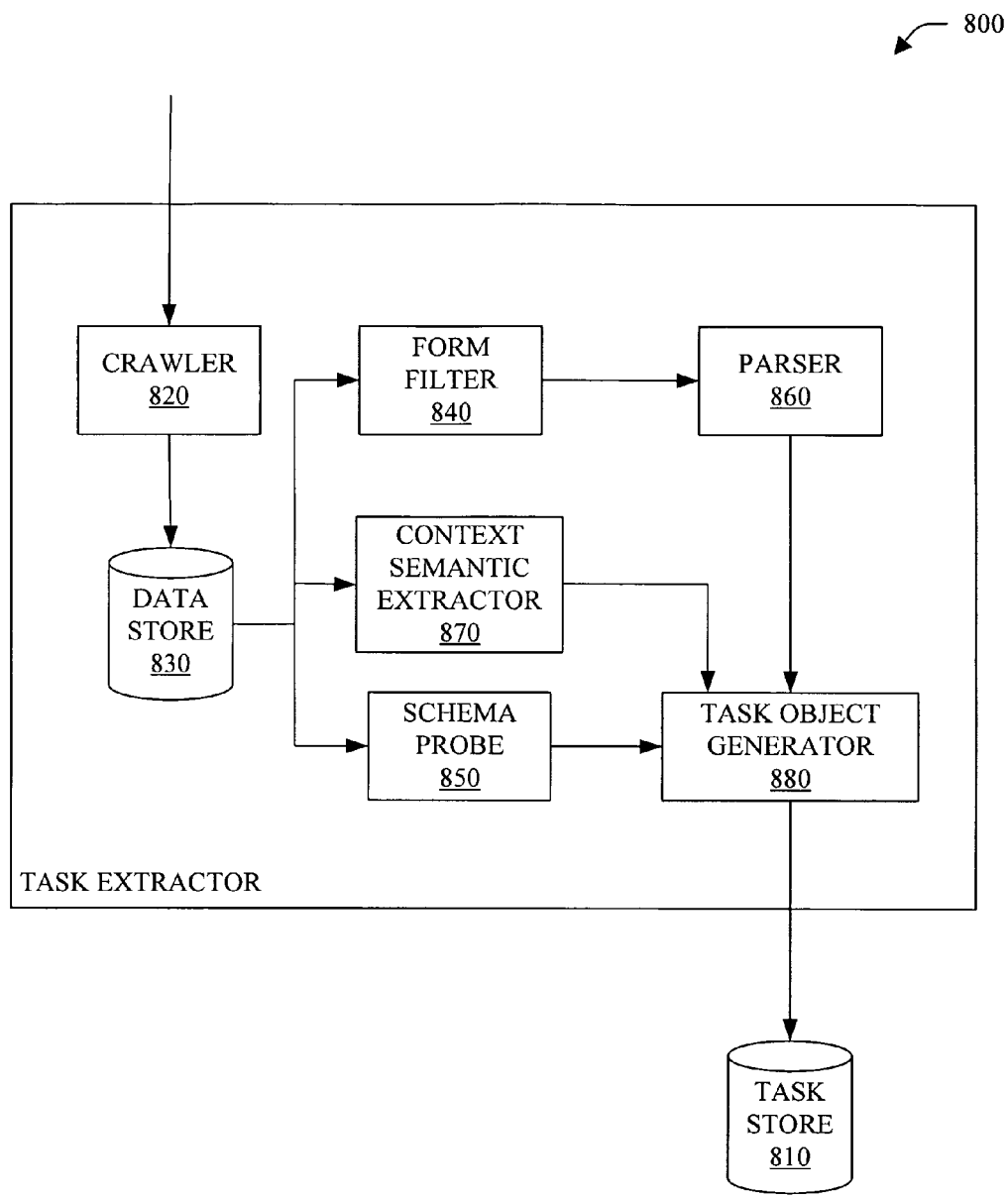
FIG. 8 is a block diagram of a task extractor.

Next, referring to FIG. 8, a task extractor 800 is illustrated. The task extractor 800 can automatically extract task(s) from given seed website(s) (e.g., from BHOs 110). For example, the task extractor 800 can be a component of the semantic reasoning component 130 and receive information regarding seed website(s) from BHOs 110.

For purposes of explanation, task(s) can be limited to form-enabled task(s), that is, task(s) that have a form as their input parameter(s). The output of the task extractor 800 is task object(s) that can be stored in a task store 810 (e.g., to be utilized by the semantic reasoning component 130).

Since task object(s) generally require field(s) of keyword (s) and a description of the task, a significant function of the task extractor 800 is discovering semantic information about the task (e.g., the functionality of the task for end user(s)). Additionally, the task extractor 800 can discover a description user(s) would type in when they want to perform this task. In one example, this functionality can be obtained by obtaining information from the form (e.g., HTML form) and its context. In another example, a query probing technique can be employed.

Given the seed website, which is identified as containing common task(s) beforehand, a crawler 820 can first crawl the web page(s) under this seed website and write them into a data store 830. Also, the crawler 820 can record linkage between different web pages in another table, for the reason that the links to and from a web page may induce some semantic information for tasks on the web page.

Next, a form filter 840 and, optionally, a schema probe 850 can employ the web page information stored in the data store 830. The form filter 840 can extract form(s) (e.g., HTML form(s)) from raw text (e.g., HTML raw text). Furthermore, optionally, the form filter 840 can filter out form(s) having the same functionality and/or pointing to the same action, which is often the case for web pages under the same website. A simple example for this situation is that there would be many pages having a particular search engine's form, but it is desirable to only have a single task object in the task store 810.

The form filter 840 passes filtered form(s) to the parser 860 which then extracts structured information of the form(s), including action URI (universal resource identifier), method, input type, etc. Moreover, the default value for INPUT in HTML form(s) may provide information about the slot entity.

Next, a context semantic extractor 870 captures semantic information other than that in HTML tags. Both slot-level information as well as task-level information can be captured. For example, with respect to word(s) that appear immediately in front of an INPUT element are highly likely to bring in slot-level information for the INPUT element. On the other hand, the TITLE of the web page and/or words immediately before or after the form may provide task-level information. However, in one example, it is likely that simply extracting information in certain contextual positions does not yield acceptable performance. In this case, substantially all the data on the web page can be employed as a richer context, which at the same time brings in a quantity of unwanted noise. A weighted importance model for data on the same web page can be introduced to address this noise-filtering/relevant information extraction issue. Importance can depend, for example, on the distance from the Form, or the IDF of that word, etc.

The optional schema probe 850 can provide information about the entities for slots. The schema probe 850 can automatically generate query and obtain feedback and/or more description information about slot entities.

For each form, a task generator 880 can collect the task information from the parser 860, the context semantic extractor 870, and, optionally, the schema probe, to create a task object. Thereafter, the task generator 880 can store the generated task object in the task store 810.

It is to be appreciated that the system 100, the browser 110, the browser help object(s) 120, the semantic reasoning component 130, the system 200, the search engine 210, the task extractor 800, the task store 810, the crawler 820, the data store 830, the form filter 840, the schema probe 850, the parser 860, the context semantic extractor 870 and/or the task object generator 880 can be computer components as that term is defined herein.

Turning briefly to FIGS. 9-13, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 9:
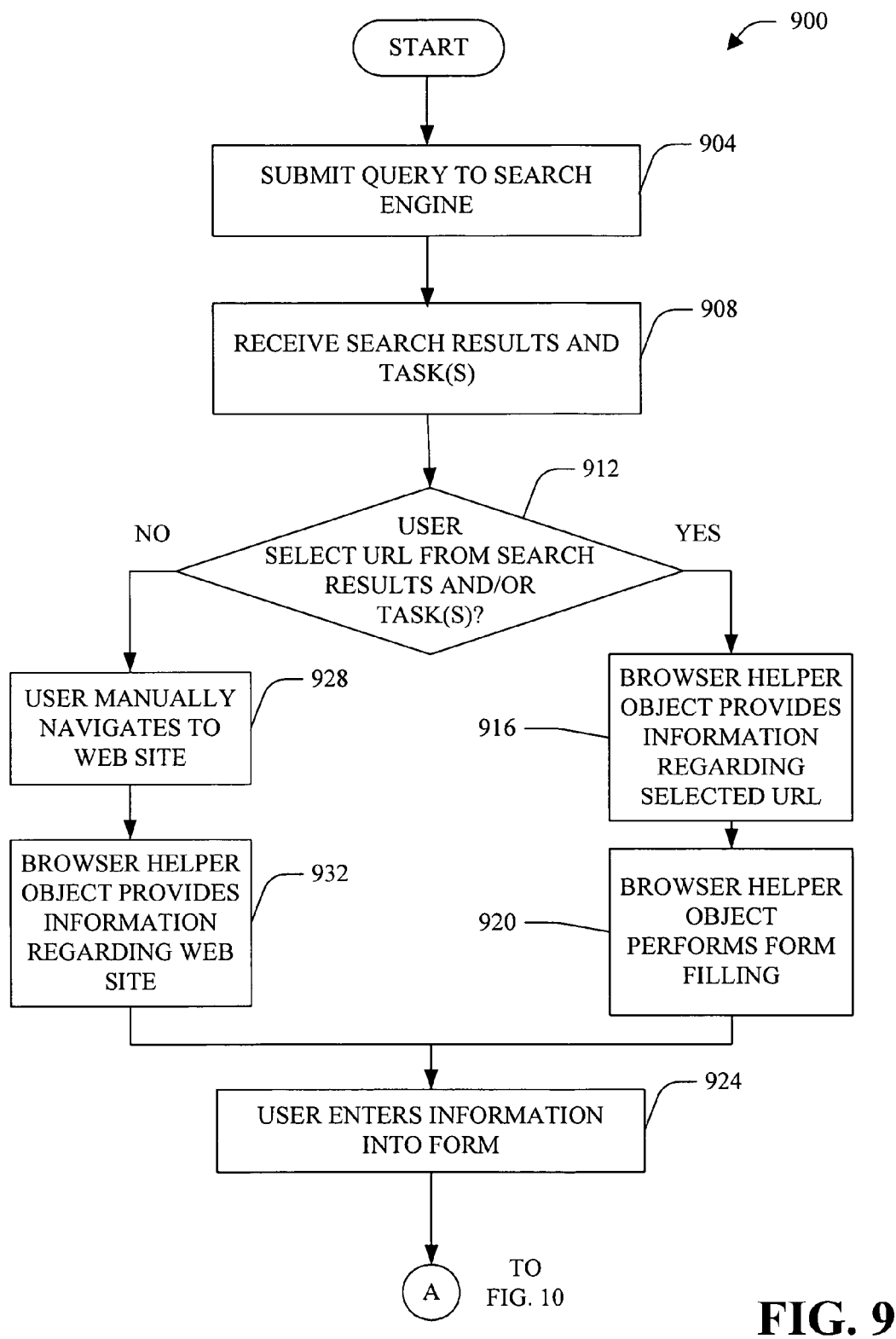
FIG. 9 is a flow chart of a method facilitating a user query session.
Figure 10:
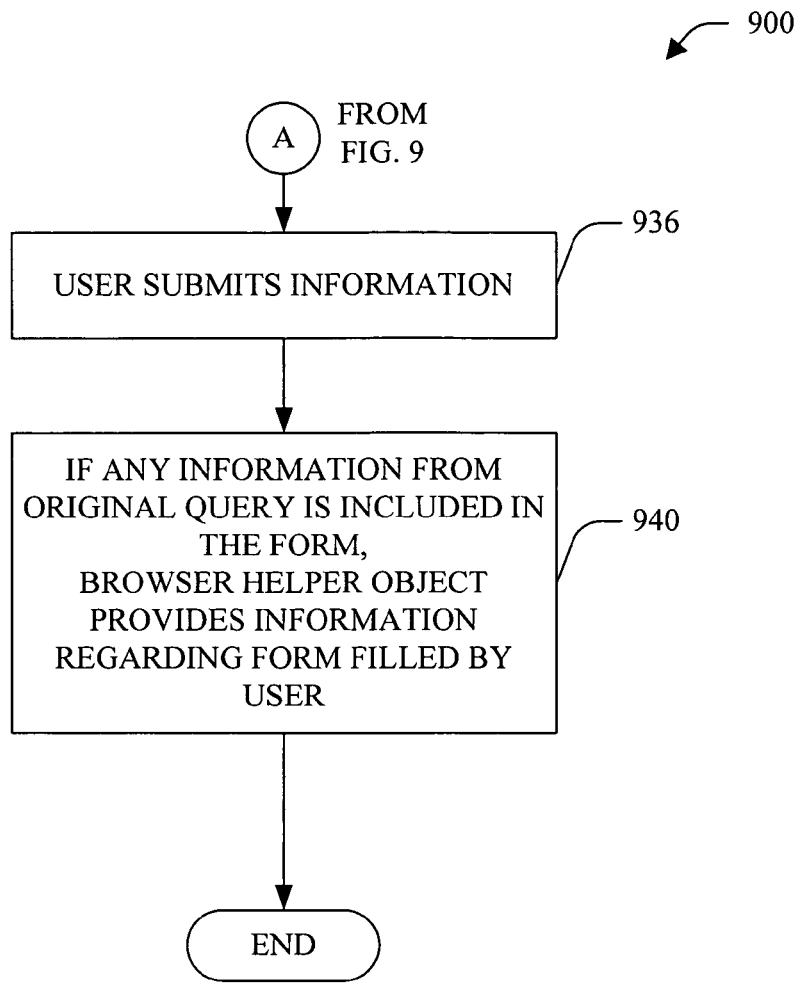
FIG. 10 is a flow chart further illustrating the method of FIG. 9

Referring to FIGS. 9 and 10, a method facilitating a user query session 900 is illustrated. At 904, a query (e.g., natural language query) is submitted to a search engine. At 908, search results and at least one task are received from the search engine responsive to the query. At 912, a determination is made as to whether the user has selected a URL from the search results and/or task(s) received from the search engine. If the determination at 912 is YES, at 916, a browser helper object (e.g., BHO 110) provides information regarding the selected URL, for example, to the search engine and/or a semantic reasoning component. At 920, the browser helper object performs form filling on a form associated with the selected URL based, at least in part, upon the original query, and, processing continues at 924.

If the determination at 912 is NO, at 928, the user manually navigates to a website. At 932, the browser helper object provides information regarding the website (e.g., URL) to the search engine and/or semantic reasoning component.

At 924, the user enters information into a form associated with the website. At 936, the user submits the information. At 940, if any information from the original query is included in the form, the browser helper object provided information regarding the form filled by the user, for example, to the search engine and/or semantic reasoning component.

Figure 11:
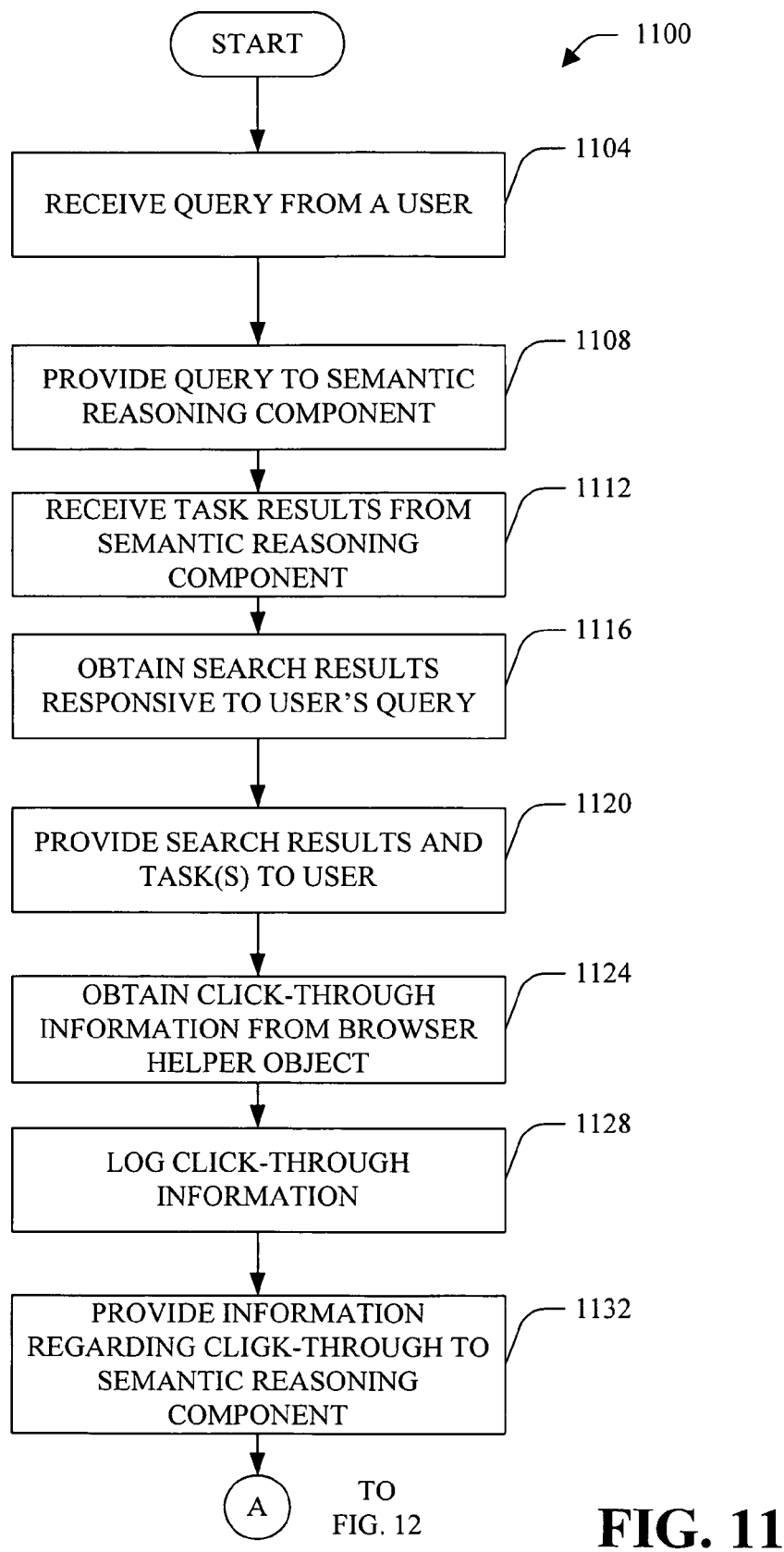
FIG. 11 is a flow chart of a search engine method.
Figure 12:
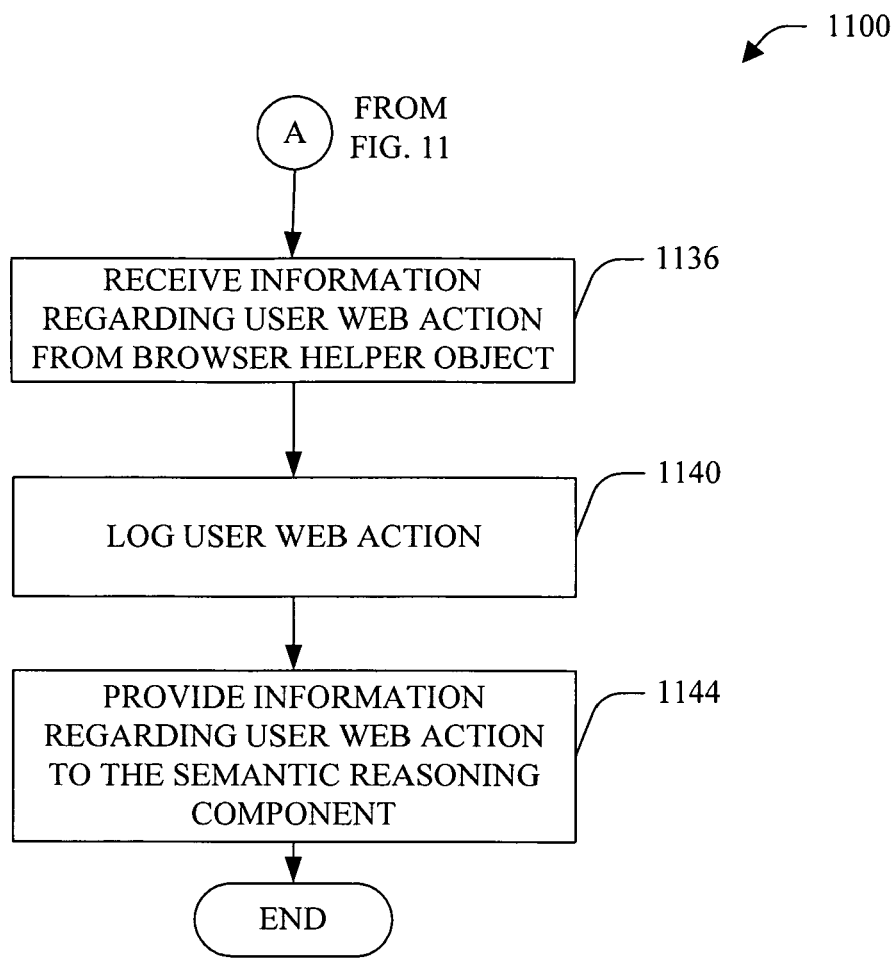
FIG. 12 is a flow chart further illustrating the method of FIG. 11.

Turning to FIGS. 11 and 12, a search engine method 1100 is illustrated. at 1104, a query (e.g., natural language query) is received from a user. At 1108, the query is provided to a semantic reasoning component. At 1112, task results are received from the semantic reasoning component. At 1116, search results responsive to the user's query are obtained.

At 1120, the search results and at least one task are provided to the user. At 1124, click-through information is obtained from a browser helper object. At 1128, the click-through information is provided to the semantic reasoning component.

At 1136, information regarding a user web action is received from the browser helper object. At 1140, the user web action is logged. Finally, at 1144, information regarding the user web action is provided to the semantic reasoning component.

Figure 13:
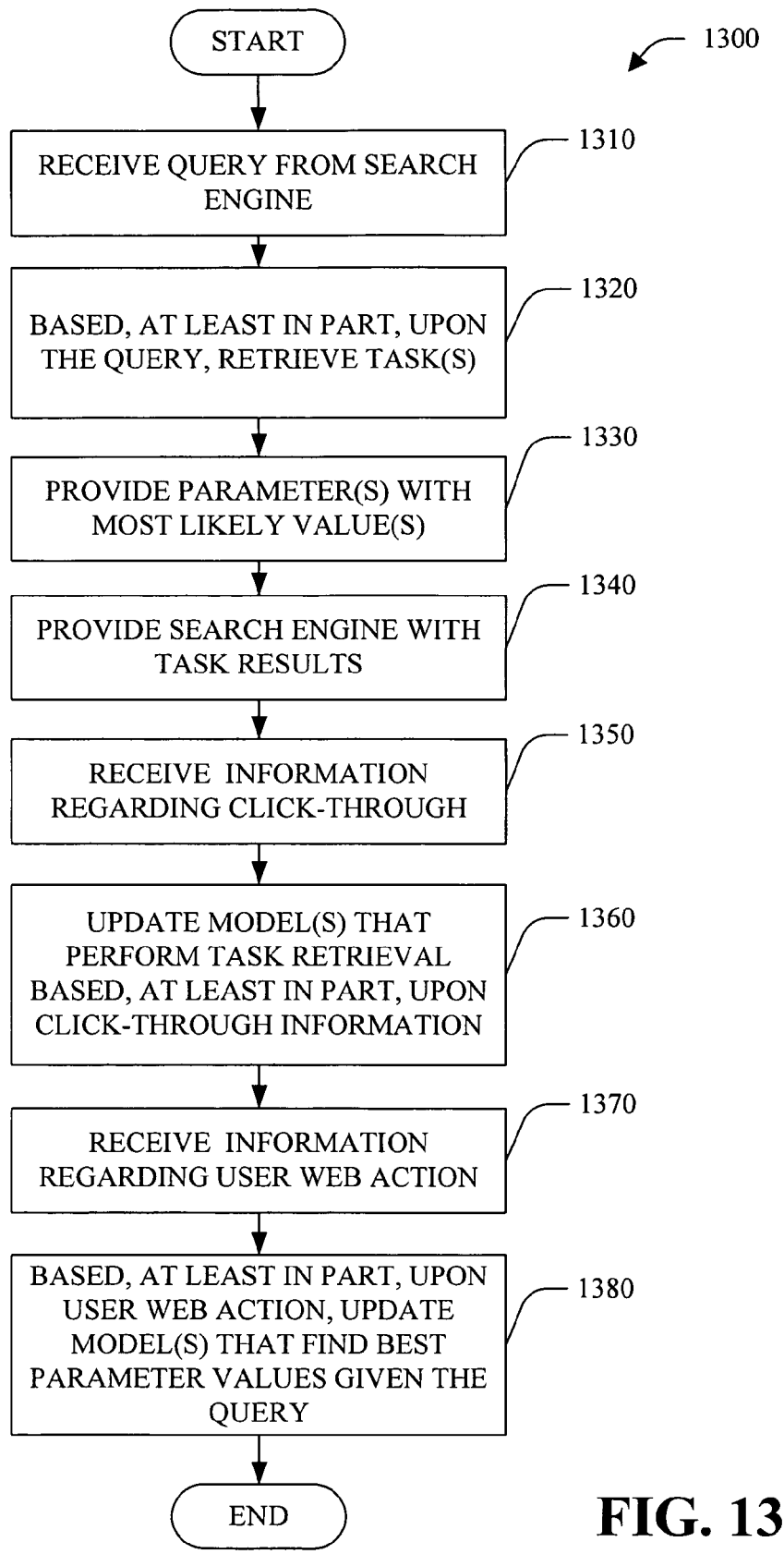
FIG. 13 is a flow chart of a semantic reasoning component method.

Next referring to FIG. 13, a semantic reasoning component method 1300 is illustrated. At 1310, a query is received from a search engine. At 1320, task(s) are retrieved based, at least in part, upon the query. At 1330, parameter(s) are provided with most likely value(s). At 1340, the search engine is provided with the task results.

At 1350, click-through information is received, for example, from the search engine and/or a browser helper object. At 1360, model(s) that perform task retrieval are updated based, at least in part, upon the click-through information.

At 1370, information regarding a user's web action is received, for example, from the search engine and/or a browser helper object. At 1380, model(s) that find best parameter value given the query are updated based, at least in part, upon the user web action.

Figure 14:
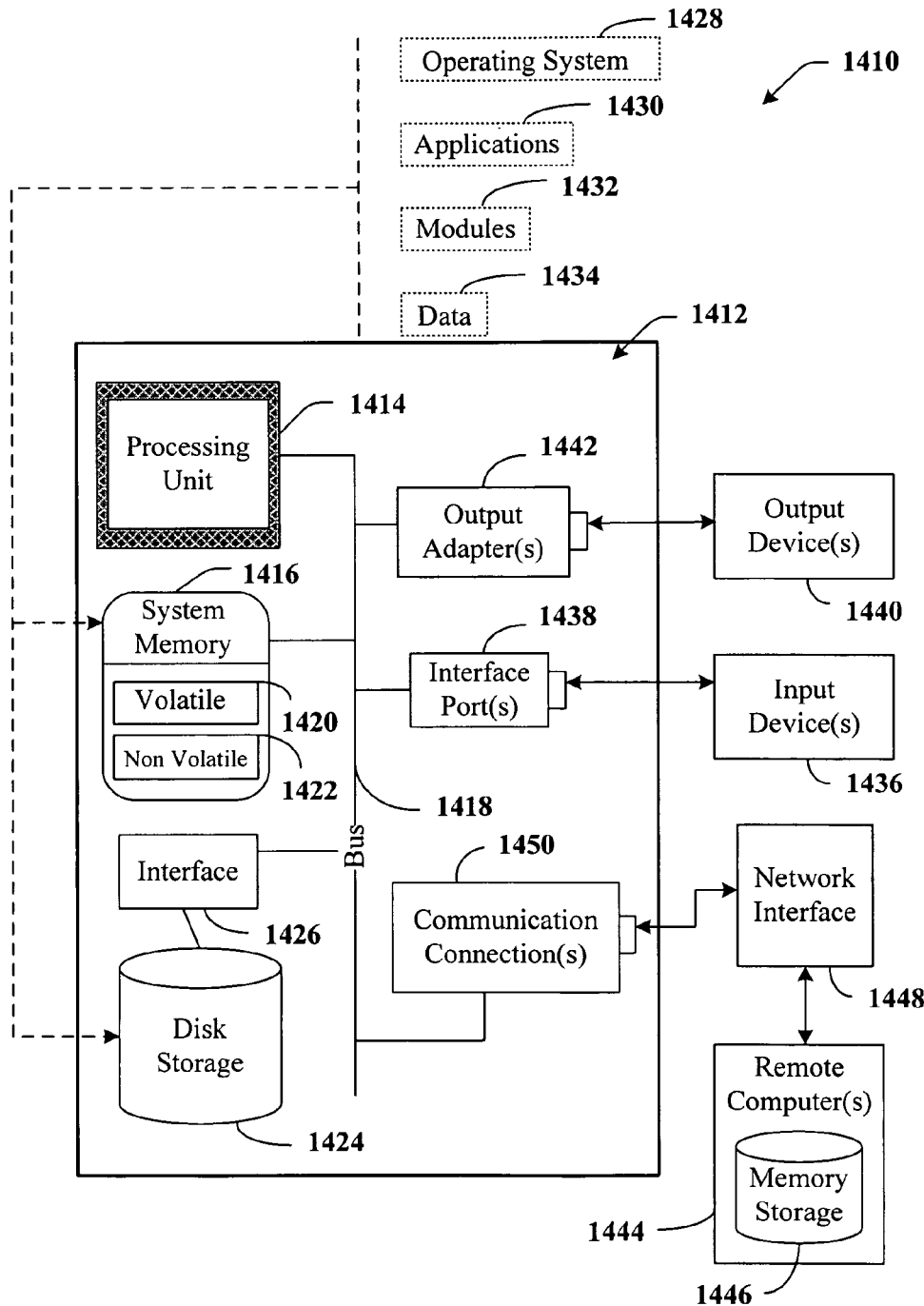
FIG. 14 illustrates an example operating environment.

In order to provide additional context for various aspects of the claimed subject matter, FIG. 14 and the following discussion are intended to provide a brief, general description of a suitable operating environment 1410. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A task system, including a processor communicatively coupled to a memory, the memory having stored therein computer-executable instructions configured to implement the task system comprising:
   a browser that receives a query, and in response to receiving the query,
      further receives search results from a search engine for a search based at least in part on the query received, and
      further receives information related to at least one task object, wherein the at least one task object is selected from one or more sets of task objects stored in one or more memories, each task object comprises at least one modifiable parameter facilitating selection of the at least one task object based at least in part on the query received by the browser;
   a browser helper object that binds to the browser at runtime, the browser helper object provides information associated with a user's action with respect to the received search results or the received information related to at least one task object, the browser helper object creates an object model corresponding to a schema associated with a web page associated with the user's action, the browser helper object further inserts at least one of the at least one modifiable parameter into a form associated with a web page associated with the user's action, the browser helper object further provides click-through information when the user's action comprises selecting a Uniform Resource Locator (URL) from the received search results, the click-through information including the selected URL, the browser helper object further provides information regarding a website when the user's action comprises manually navigating to the website, the information regarding the website including the URL of the website;
   a task retrieval model that is updated when the search results are received, the task retrieval model updated based on the click-through information obtained from the browser helper object; and
   a slot-filling model that is updated when the search results are received, the slot-filling model having one or more slots that hold pieces of information about the at least one task object, the slot-filling model being updated with at least one new parameter representing one new piece of information not currently present in the slot-filling model when the search results include the new piece of information and the new piece of information is not present in the slot-filling model, the slot-filling model also learning one or more new patterns for filling slots based on the search results.

2. The system of claim 1, further comprising a semantic reasoning component that identifies the at least one task object based, at least in part, upon the query.

3. The system of claim 2, the semantic reasoning component comprising an information retrieval model and a query classification model.

4. The system of claim 3, the semantic reasoning component updates the information retrieval model and/or the query classification model based, at least in part, upon the information associated with the user's action.

5. The system of claim 2, the semantic reasoning component, the browser and the browser helper object resident on a user's computer system.

6. The system of claim 2, the semantic reasoning component creates a new task object based, at least in part, upon the information associated with the user's action.

7. The system of claim 2, the semantic reasoning component further comprises a slot-filling model that provides a slot value based upon a particular task object and the query.

8. The system of claim 7, the slot-filling model updated based, at least in part, upon the information associated with the user's action.

9. The system of claim 1, the information associated with the user's action comprising a clicked-through URL.

10. The system of claim 1, the information associated with the user's action comprising a manually entered URL.

11. The system of claim 1, the information associated with the user's action does not contain any information which is constituted as personally identifiable.

12. The system of claim 1, the task object comprising at least a name parameter, a title parameter, a description parameter and a keyword parameter.

13. A method facilitating a user query session, comprising:
   receiving search results and information related to at least one task object comprising at least one modifiable parameter, the at least one task object selected from a task object database, the search results and information being responsive to a query;
   using a browser helper object to obtain information from the search results, the browser helper object:
      binding to a browser at runtime, the browser helper object providing information associated with a user's action with respect to the received search results or the received information related to the at least one task object;
      creating an object model corresponding to a schema associated with a web page associated with the user's action, the browser helper object inserting at least one of the at least one modifiable parameter into a form associated with the web page associated with the user's action;
      providing click-through information when the user's action comprises selecting a Uniform Resource Locator (URL) from the received search results, the click-through information including the selected URL; and
      providing information regarding a website when the user's action comprises manually navigating to the website, the information regarding the website including the URL of the website;
   providing the information obtained from the browser helper object regarding the selected URL;
   performing form filling on the form associated with the selected URL based, at least in part, upon the query;

providing information extracted from the form filled by the user, if any information from the query is included in the form;

updating a task retrieval model when the search results are received, the task retrieval model updated based on the click-through information obtained from the browser helper object when the search results are obtained; and updating a slot-filling model when the search results are received, the slot-filling model having one or more slots that hold pieces of information about the at least one task object, the slot-filling model being updated with at least one new parameter representing one new piece of information not currently present in the slot-filling model when the search results include the new piece of information and the new piece of information is not present in the slot-filling model, the slot-filling model also learning one or more new patterns for filling slots based on the search results.

14. The method of claim 13, further comprising:
providing information regarding a manually navigated website.

15. The method of claim 13, further comprising:
submitting the query to a search engine.

16. The method of claim 13, the performing of form filling on a form comprises inserting a value into at least one of one or more input boxes or one or more selection boxes.

17. A computer-implemented task object library system facilitating automatic form filling comprising:
a processor communicatively coupled to a memory, the memory having stored therein computer-executable instructions configured to implement the task object library system including:
   a task store comprising one or more task objects, wherein each task object further comprises at least one modifiable parameter;
   a browser that receives a user query and based at least in part on the received query:
      facilitates relaying the user query to a search engine and receives the results of the search engine operations on the relayed user query,
      accesses at least one task object of the task store, and receives at least one parameter value therefrom, when a task object related to the query is accessible in the task store, and
      generates a task object with at least one modifiable parameter and facilitates storing the generated task object in the task store, when a task object related to the query is not accessible in the task store;
   a runtime browser helper object that automatically populates form fields or forms related to an accessed Uniform Resource Locator (URL) based at least in part on the user query and the at least one received modifiable parameter, the runtime browser helper object creating an object model corresponding to a schema associated with a web page associated with a user's action, the browser helper object further provides click-through information when the user's action comprises selecting a URL from the received results of the search engine operations, the click-through information including the selected URL, the browser helper object further provides information regarding a website when the user's action comprises manually navigating to the website, the information regarding the website including the URL of the website;
   a task retrieval model that is updated when the search results are received, the task retrieval model updated based on the click-through information obtained from the browser helper object; and
   a slot-filling model that is updated when the search results are received, the slot-filling model having one or more slots that hold pieces of information about the at least one task object, the slot-filling model being updated with at least one new parameter representing one new piece of information not currently present in the slot-filling model when the search results include the new piece of information and the new piece of information is not present in the slot-filling model, the slot-filling model also learning one or more new patterns for filling slots based on the search results.

* * * * *